United States Patent
Li et al.

(10) Patent No.: US 10,142,483 B2
(45) Date of Patent: Nov. 27, 2018

(54) TECHNOLOGIES FOR DYNAMIC AUDIO COMMUNICATION ADJUSTMENT

(71) Applicant: Intel Corporation, Santa Clara, CA (US)

(72) Inventors: Hong Li, El Dorado Hills, CA (US); Tauben Tenty, Swindon (GB); Rita H. Wouhaybi, Portland, OR (US); Igor Tatourian, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 14/979,117

(22) Filed: Dec. 22, 2015

(65) Prior Publication Data

US 2017/0180558 A1    Jun. 22, 2017

(51) Int. Cl.
*H04M 3/42* (2006.01)
*H04M 3/56* (2006.01)
*H04L 29/06* (2006.01)

(52) U.S. Cl.
CPC ........ *H04M 3/568* (2013.01); *H04L 65/1089* (2013.01); *H04L 65/403* (2013.01); *H04M 2201/40* (2013.01); *H04M 2203/2038* (2013.01); *H04M 2250/12* (2013.01); *H04M 2250/66* (2013.01)

(58) Field of Classification Search
CPC .............................. H04M 3/568; H04L 65/403
USPC .............................................. 379/202.01, 158
See application file for complete search history.

(56) References Cited

U.S. PATENT DOCUMENTS

| | | | |
|---|---|---|---|
| 9,571,628 B1* | 2/2017 | Bostick | H04M 1/72569 |
| 2004/0196989 A1* | 10/2004 | Friedman | G10L 21/04 381/119 |
| 2005/0058278 A1* | 3/2005 | Gallego Hugas | G10L 21/0208 379/406.01 |
| 2005/0130709 A1* | 6/2005 | Muszkiewicz | H04M 1/22 455/566 |

(Continued)

FOREIGN PATENT DOCUMENTS

EP    2312793    4/2011

OTHER PUBLICATIONS

International search report for PCT application No. PCT/US2016/063272, dated Feb. 22, 2017 (3 pages).

(Continued)

*Primary Examiner* — William Deane, Jr.
(74) *Attorney, Agent, or Firm* — Barnes & Thornburg LLP

(57) ABSTRACT

Technologies for adaptive audio communications include a telecommunications device configured to collect session data of a communication session that includes an audio stream between a user of the telecommunications device and at least one other user of a remote telecommunications device. The telecommunications device is further configured to determine a session context of the communication session based on the collected session data, determine whether the session data includes an anomaly, and adjust, in response to a determination that the anomaly was detected, at least one of a portion of the audio stream of the communication session and a setting of the telecommunications device based on the anomaly. Other embodiments are described and claimed.

25 Claims, 3 Drawing Sheets

(56) References Cited

U.S. PATENT DOCUMENTS

| | | | |
|---|---|---|---|
| 2005/0282590 A1* | 12/2005 | Haparnas | H04M 19/044 455/570 |
| 2006/0236395 A1* | 10/2006 | Barker | G06F 21/552 726/23 |
| 2008/0160977 A1 | 7/2008 | Ahmaniemi et al. | |
| 2009/0015651 A1* | 1/2009 | Togami | G10L 21/00 348/14.01 |
| 2009/0265456 A1 | 10/2009 | Bouvier et al. | |
| 2012/0185418 A1* | 7/2012 | Capman | G06N 99/005 706/12 |
| 2012/0250830 A1* | 10/2012 | Lam | H04M 3/2227 379/32.01 |
| 2012/0308044 A1 | 12/2012 | Vander Mey et al. | |
| 2013/0279678 A1 | 10/2013 | Beerse et al. | |
| 2014/0335836 A1* | 11/2014 | Zhang | G06F 3/165 455/414.1 |
| 2015/0016633 A1* | 1/2015 | Gao | H03G 3/20 381/107 |
| 2015/0120336 A1* | 4/2015 | Grokop | B60W 40/09 705/4 |
| 2016/0162254 A1* | 6/2016 | Benattar | H04R 1/1083 700/94 |
| 2017/0078463 A1* | 3/2017 | Bullough | H04M 1/72591 |
| 2017/0094053 A1* | 3/2017 | Hogg, Jr. | H04M 3/2281 |
| 2017/0140773 A1* | 5/2017 | Bostick | G10L 21/034 |
| 2017/0187866 A1* | 6/2017 | Li | H04M 1/72572 |

OTHER PUBLICATIONS

Written opinion for PCT application No. PCT/US2016/063272, dated Feb. 22, 2017 (7 pages).

* cited by examiner

TECHNOLOGIES FOR DYNAMIC AUDIO COMMUNICATION ADJUSTMENT

BACKGROUND

Telecommunications devices have become ubiquitous tools for one person, or multiple people, to communicate with another person, or persons, at a different location, typically across a long distance (e.g., another city, state, country, etc.). Various technologies have been developed that are directed toward certain frequently occurring remote-based telecommunication interactions, such as teleconferences. Teleconferences have changed the way remotely located individuals conduct meetings by linking multiple participants in different locations via telecommunications devices, such as mobile phones, webcams, video conferencing devices, audio conferencing devices, content sharing devices, and the like. Typically, such telecommunications device-enabled communications are more sophisticated than a simple two-way phone connection. For example, features beyond that of general telephone functionality may be found in certain telecommunications devices directed toward teleconferencing, including full-duplex speakerphones, an array of microphones and speakers, noise reduction technologies, amplified volume output, improved sound quality, etc. Unsurprisingly, teleconference attendees can spend significant portions of their day in conference calls with colleagues, employees, clients, etc.

However, depending on the environment in which a communication session is taking place, participants may experience distractions, awkward interactions, unintended situations, etc., that can detract from the quality of the communication session. As such, various technologies have been implemented to reduce background noise (e.g., a noise filtering/attenuation feature), such as may be detected by a microphone of the communication device, or eliminate sound altogether (e.g., a mute feature).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
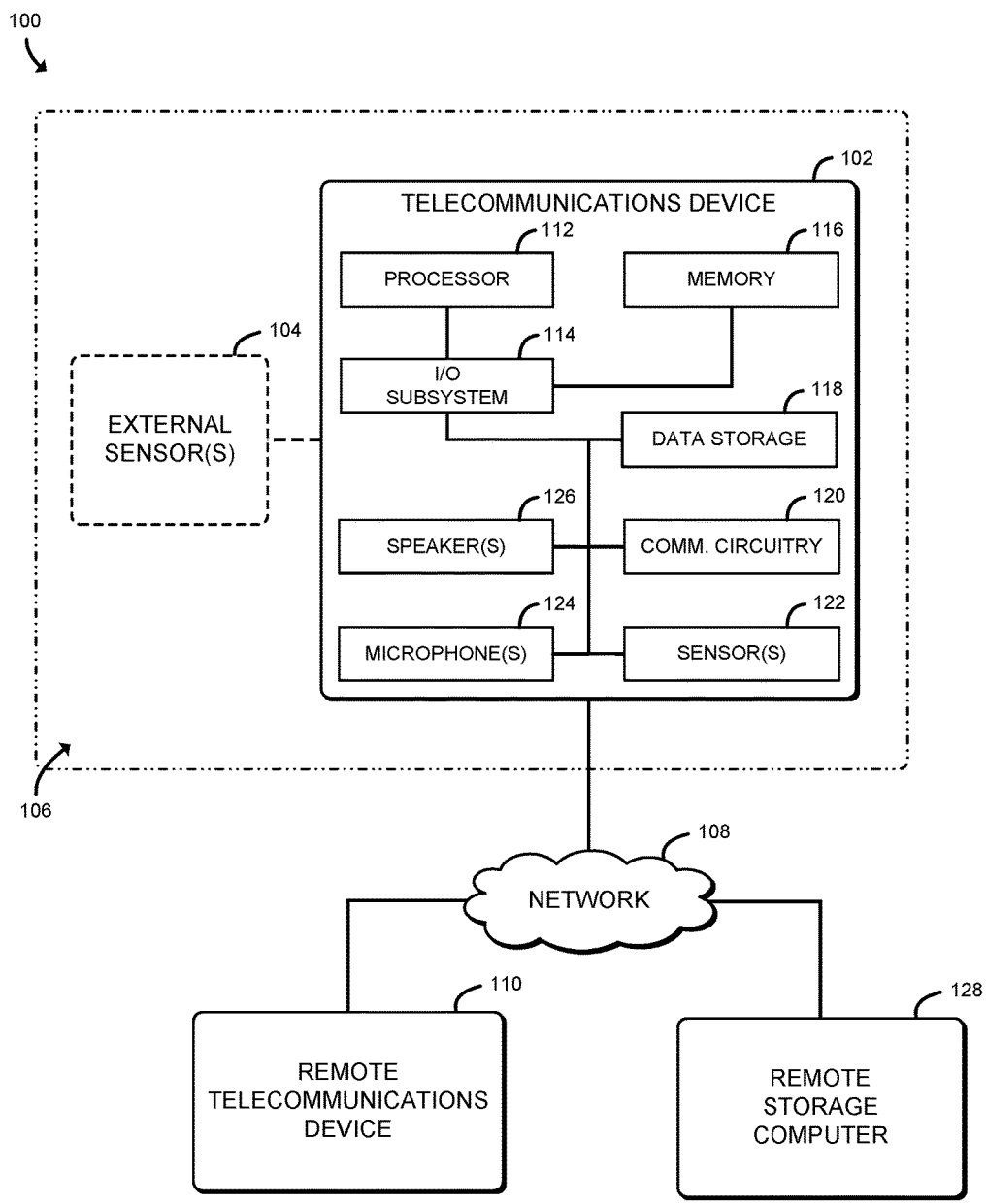
FIG. 1 is a simplified block diagram of at least one embodiment of a system for dynamic audio communication adjustment that includes a telecommunications device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for dynamic adjustment of audio communications includes a telecommunications device 102 communicatively coupled to a remote telecommunications device 110 over a network 108. While only a single remote telecommunications device 110 is shown in the illustrative system 100, it should be appreciated that more than one remote telecommunications device 110 may be communicatively coupled to the telecommunications device 102, in other embodiments. In the illustrative system 100, the telecommunications device 102 is further communicatively coupled to a remote storage computer 128 via the network 108.

In use, the telecommunications device 102 is configured to establish and manage a communication session with one or more of the remote telecommunications devices 110. It should be appreciated that the communication session includes an audio stream, such as in an audio only communication session, an audio/video communication session, etc. The telecommunications device 102 is further configured to dynamically adjust at least a portion of the audio stream under certain conditions. To do so, the telecommunications device 102 is configured to collect sensor data, such as from external sensors (e.g., the external sensors 104) and/or internal sensors (e.g., the sensor(s) 120 of the telecommunications device), that includes information related to the audio stream, the telecommunications device 102, and/or an environment 106 in which the telecommunications device 102 is operated. The telecommunications device 102 is further configured, as described in detail below, to analyze the collected sensor data to determine whether a previously learned anomaly exists, and either make an adjustment to a portion of the audio stream based on a learned response to the known anomaly or learn a response to the unknown anomaly for use during the next instance in which the anomaly is recognized.

The telecommunications device 102 may be embodied as any type of communications or compute device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a web-cam with audio support, an audio teleconferencing device, a speakerphone, a personal computer, a distributed computing system, a processor-based system, a multiprocessor system, and/or any other computing/communication device that supports audio stream transmission/reception.

The illustrative telecommunications device 102 includes a processor 112, an input/output (I/O) subsystem 114, a memory 116, a data storage device 118, communication circuitry 120, one or more sensors 122, one or more microphones 124, and one or more speakers 126. Of course, in other embodiments, the telecommunications device 102 may include other or additional components, such as those commonly found in a compute device. Additionally, in some embodiments, one or more of the illustrative components may be incorporated in, or otherwise form a portion of, another component. For example, the memory 116, or portions thereof, may be incorporated in the processor 112 in some embodiments. Further, in some embodiments, one or more of the illustrative components may be omitted from the telecommunications device 102.

The processor 112 may be embodied as any type of processor capable of performing the functions described herein. For example, the processor 112 may be embodied as a single or multi-core processor(s), digital signal processor, microcontroller, or other processor or processing/controlling circuit. The memory 116 may be embodied as any type of volatile or non-volatile memory or data storage capable of performing the functions described herein. In operation, the memory 116 may store various data and software used during operation of the telecommunications device 102, such as operating systems, applications, programs, libraries, and drivers.

The memory 116 is communicatively coupled to the processor 112 via the I/O subsystem 114, which may be embodied as circuitry and/or components to facilitate input/output operations with the processor 112, the memory 116, and other components of the telecommunications device 102. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 112, the memory 116, and/or other components of the telecommunications device 102, on a single integrated circuit chip.

The data storage device 118 may be embodied as any type of device or devices configured for short-term or long-term storage of data, such as memory devices and circuits, memory cards, hard disk drives, solid-state drives, or other data storage devices, for example. It should be appreciated that the data storage device 118 and/or the memory 116 (e.g., the computer-readable storage media) may store various types of data capable of being executed by a processor (e.g., the processor 112) of the telecommunications device 102, including operating systems, applications, programs, libraries, drivers, instructions, etc.

The communication circuitry 120 may be embodied as any communication circuit, device, or collection thereof, capable of enabling communications between the telecommunications device 102 and other computers (e.g., the remote telecommunications device 110, the remote storage computer 128, etc.) over a network (e.g., the network 108). For example, the communication circuitry 120 may include a network interface controller (NIC) (not shown) and/or other devices capable of performing network communication-related operations. The communication circuitry 120 may be configured to use any one or more wired or wireless communication technologies and associated protocols (e.g., Ethernet, Wi-Fi®, Bluetooth®, Bluetooth® Low Energy (BLE), near-field communication (NFC), Worldwide Interoperability for Microwave Access (WiMAX), etc.) to affect such communication. The communication circuitry 120 may be additionally configured to use any one or more wireless and/or wired communication technologies and associated protocols to effect communication with the other computing devices.

The sensors 122 may be embodied as any type of circuitry, hardware, software, or combination thereof capable of performing the functions described herein, including, but not limited to, sound level sensors, light sensors, image sensors, global positioning sensors, etc. In use, the sensors 122 are configured to detect data relative to the telecommunications device 102 and/or the environment 106 in which the telecommunications device 102 is located, collectively referred to herein as session context properties. For example, in some embodiments, data related to the telecommunications device 102 may include a characteristic of the telecommunications device 102 (e.g., a volume setting, capabilities of the telecommunications device 102, one or more files stored on the telecommunications device 102, etc.), image data of the user of the telecommunications device 102 (e.g., to determine whether a gesture or a particular sequence of movements was detected), audio (e.g., primary noise, background noise, etc.) received by the telecommunications device 102 (e.g., via the one or more microphones 124).

In another example, in some embodiments, data related to the environment 106 may include a location, a time of day, a typical action of the user during that time of day in previous communication sessions, a location of the user, a lighting condition, detection of people (i.e., participating and non-participating persons) in the environment 106, a location of the telecommunications device 102 (e.g., a location of the environment 106, a location of the telecommunications device 102 relative to the environment 106, etc.), an image of the user, an image of the environment of the user, an amount of ambient light, an amount of ambient sound, a type of ambient sound, and a proximity of the user to the telecommunications device 102.

It should be further appreciated that the sensors 122 may include additional and/or alternative sensors commonly found in a computer, such as depth sensor(s) usable to estimate depths of objects in a field of view of the telecommunications device 102, motion detecting sensor(s) capable of detecting a motion or gesture within a proximate distance from telecommunications device 102, etc. In some embodiments, the sensors 122 may additionally include other sensors not commonly found in a computer, such as various biometric feedback sensors, including biosignal sensors to sense electrical resistance (e.g., a galvanic skin response), skin moisture or temperature, or magnetic fields (e.g., a Magnetoencephalogram, or MEG), while still other biometric feedback sensors may be used for neuro-vascular coupling (e.g., a functional near-infrared spectroscopy, or fNIR) to sense blood flow.

The one or more microphones 124 may be embodied as any type of device or devices (e.g., acoustic-to-electric transducer, sensor, etc.) configured to convert sound into an electrical signal. In some embodiments, depending on the embodiment of the microphone, the one or more microphones 124 may be configured to use electromagnetic induction, capacitance change, fiber optics, lasers, piezoelectricity, etc. It should be appreciated that the telecommunications device 102 includes additional components (e.g., amplifiers, filters, wires, connectors, etc.) that may be required to facilitate operation of the one or more microphones, which are not shown to preserve clarity of the description. In use, the one or more microphones 124 are configured to collect audio sensor data usable to generate an audio stream capable of being transmitted from the telecommunications device 102.

The one or more speakers 126 may be embodied as any type of hardware, firmware, software, or combination thereof configured to convert an electrical audio signal into corresponding sound (i.e., provide auditory feedback via sound waves). For example, in some embodiments, one or more of the speakers 126 may be embodied as a loudspeaker (i.e., an electroacoustic transducer), a computer speaker, a wireless speaker, a digital speaker, etc. It should be appreciated that the telecommunications device 102 may include additional peripheral I/O devices (e.g., input/output devices, interface devices, and/or other peripheral devices) that are not shown for clarity of the description. In such embodiments, the additional peripheral I/O devices may include a display, a touch screen, graphics circuitry, a keyboard, a mouse, and/or other input/output devices, interface devices, and/or other peripheral devices.

It should be appreciated that, in some embodiments, the telecommunications device 102 may receive at least a portion of data related to the telecommunications device 102 and/or the environment 106 from sensors external to the telecommunications device 102, such as the external sensors 104 of the illustrative system 100. Accordingly, in such embodiments, the telecommunications device 102 may be communicatively coupled to one or more external sensors 104 located external to the telecommunications device 102 and within the environment 106 (e.g., a room, an office, a cubicle, etc.) in which the telecommunications device 102 resides.

The network 108 may be embodied as any type of wired or wireless communication network, including a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 108 may serve as a centralized network and, in some embodiments, may be communicatively coupled to another network (e.g., the Internet). Accordingly, the network 108 may include a variety of other network computing devices (e.g., virtual and physical routers, switches, network hubs, servers, storage devices, compute devices, etc.), as needed to facilitate communication between the telecommunications device 102 and the remote telecommunications device 110, as well as the telecommunications device 102 and the remote storage computer 128.

Similar to the telecommunications device 102, the remote telecommunications device 110 may be embodied as any type of compute device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a web-cam with audio support, an audio teleconferencing device, a speakerphone, a personal computer, a distributed computing system, a processor-based system, a multiprocessor system, and/or any other computing/communication device that supports audio stream transmission/reception. In some embodiments, the remote telecommunications device 110 may be identical to, or substantially similar to, the telecommunications device 102, and may further be configured to perform similar functions as described herein in regard to the telecommunications device 102. As such, the remote telecommunications device 110 may include like components to those of the telecommunications device 102 which have been previously described. Accordingly, further descriptions of the like components are not repeated herein with the understanding that the description of the components provided above in regard to the telecommunications device 102 applies equally to the corresponding components of the remote telecommunications device 110.

The remote storage computer 128 may be embodied as any type of storage device capable of performing the functions described herein, including, without limitation, a server (e.g., stand-alone, rack-mounted, blade, etc.), a network appliance (e.g., physical or virtual), a switch (e.g., rack-mounted, standalone, fully managed, partially managed, full-duplex, and/or half-duplex communication mode enabled, etc.), a router, a web appliance, a personal computer, a distributed computing system, a processor-based system, and/or a multiprocessor system. It should be appreciated that the remote storage computer 128 may additionally include compute capabilities. As such, it should be appreciated that the remote storage computer 128, similar to the telecommunications device 102, may include a processor, an I/O subsystem, a memory, a data storage device, communications circuitry, etc. Accordingly, further descriptions of the like components are not repeated herein with the understanding that the description of the components provided above in regard to the telecommunications device 102 applies equally to the corresponding components of the remote storage computer 128.

Figure 2:
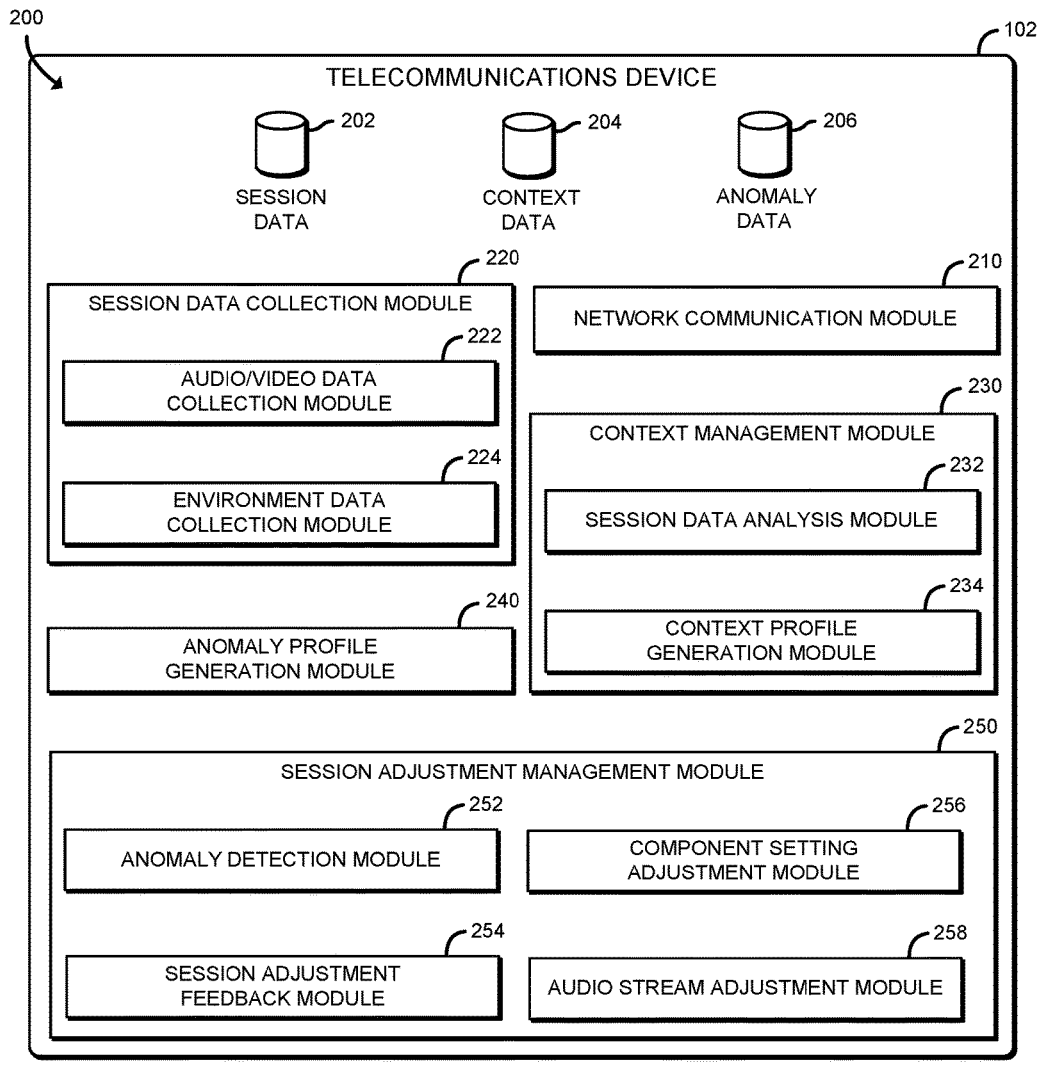
FIG. 2 is a simplified block diagram of at least one embodiment of an environment of the telecommunications device of the system of FIG. 1.

Referring now to FIG. 2, in an illustrative embodiment, the telecommunications device 102 establishes an environment 200 during operation. The illustrative environment 200 includes a network communication module 210, a session data collection module 220, a context management module 230, an anomaly profile generation module 240, and a session adjustment management module 250. Each of the modules, logic, and other components of the environment 200 may be embodied as hardware, software, firmware, or a combination thereof. For example, each of the modules, logic, and other components of the environment 200 may form a portion of, or otherwise be established by, the processor 112, the memory 116, the communication circuitry 120, and/or other hardware components of the telecommunications device 102. As such, in some embodiments, one or more of the modules of the environment 200 may be embodied as circuitry or a collection of electrical devices (e.g., network communication circuitry 210, session data collection circuitry 220, context management circuitry 230, anomaly profile generation circuitry 240, session adjustment management circuitry 250, etc.).

In the illustrative environment 200, the telecommunications device 102 includes session data 202, context data 204, and anomaly data 206, each of which may be stored in the memory 116 and/or the data storage device 118 of the telecommunications device 102, and may be accessed by the various modules and/or sub-modules of the telecommunications device 102. It should be appreciated that the telecommunications device 102 may include additional and/or alternative components, sub-components, modules, sub-modules, and/or devices commonly found in a computing device, which are not illustrated in FIG. 2 for clarity of the description.

The network communication module 210 is configured to facilitate inbound and outbound wired and/or wireless network communications (e.g., network traffic, network packets, network flows, etc.) to and from the telecommunications device 102. To do so, the network communication module 210 is configured to receive and process network packets from other computing devices (e.g., the remote telecommunications device 110, the remote storage computer 128, and/or other computing device(s) communicatively coupled to the telecommunications device 102). Additionally, the network communication module 210 is configured to prepare and transmit network packets to another computing device (e.g., the remote telecommunications device 110, the remote storage computer 128, and/or other computing device(s) communicatively coupled to the telecommunications device 102).

The session data collection module 220 is configured to collect and aggregate data of a communication session and data of an environment in which the communication session occurs (i.e., session data). To do so, the illustrative session data collection module 220 includes an audio/video data collection module 222 and an environment data collection module 224. The audio/video data collection module 222 is configured to collect audio data (i.e., input audio data) from a user of the telecommunications device 102 and the communication session (e.g., a phone conversation, a teleconference call, etc.) between the user(s) of the telecommunications device 102 and the user(s) of the remote telecommunications device 110 (i.e., received audio data). In embodiments wherein a video stream of the communication session is supported by the telecommunications device 102, the audio/video data collection module 222 may be further configured to collect video data (i.e., a sequence of images for transmission to the remote telecommunications device 110) of the communication session.

The environment data collection module 224 is configured to receive environment-related data. The environment-related data may include any type of data of the environment (e.g., the environment 106) of the telecommunications device 102 before, during, or after the communication session, such as a date and time at which the communication session is being held, a time zone in which the telecommunications device 102 is located, a geo-location of the telecommunications device 102, and/or any other environment-related properties of the environment 106. It should be appreciated that one or more characteristics of the environment-related data may be determined from the one or more sensors 122 of the telecommunications device 102 and/or the external sensors 104. In some embodiments, the data collected and aggregated by the session data collection module 220 may be stored in the session data 202.

The context management module 230 is configured to manage context profiles, which include portions of session data from which behaviors of a user of the telecommunications device 102 have been observed (i.e., session context properties). As such, the context profiles may include one or more session context properties that represent historically perceived/recorded actions of the user (i.e., learned actions) and/or the communication session, such as a time of day of the communication session, a learned action of the user during that time of day in previous communication sessions, a location of the user, a recognized voice sample, a voice volume setting, a type of communication session (e.g., a business call, a personal call, etc.), a number of participants of the communication session, an identity of the participants of the communication session, a relationship between the participants of the communication session, a location of the telecommunications device 102 in which the communication session is being conducted, a physical condition of the user at the time of the communication session, a number of non-participants in proximity to the telecommunications device 102, an activity one or more of the participants or non-participants is presently engaged in, an emotional state of the participants of the communication session, etc., as well as a typical location of the user during that time of day in previous communication sessions, voice patterns, user reactions, etc., as may be determined based on analysis thereof. It should be appreciated that the session context (i.e., the session context properties) may be stored in a context profile, as described previously.

To generate the one or more context profiles, the illustrative context management module 230 includes a session data analysis module 232 and a context profile generation module 234. The session data analysis module 232 is configured to analyze or otherwise logically group the session data, such as may be collected by the session data collection module 220, using deep-learning neural network algorithms, machine learning algorithms, etc. The context profile generation module 234 is configured to generate context profiles based on the analyzed session data. In some embodiments, the context profiles may be stored in the context data 204.

The anomaly profile generation module 240 is configured to generate anomaly profiles. The anomaly profiles illustratively include user-specific interactions (e.g., behaviors, gestures, situations, etc.) and corresponding responses (e.g., adjust a setting of the phone, edit portions of audio stream, etc.) as determined or otherwise learned from user behavior in previous communication sessions, such as may be determined using deep-learning neural network algorithms. Further, the anomaly profile generation module 240 is configured to generate the anomaly profiles based on the context of the communication session, such as may be determined from a context profile generated by the context management module 230. In some embodiments, the anomaly profiles may be stored in the anomaly data 206. Additionally, in some embodiments, the anomaly profiles may be transmitted to the remote storage computer 128 for storage, which may then be usable to bootstrap new telecommunication devices and/or new users.

For example, the anomaly profile generation module 240 may generate an anomaly profile upon detection of an eminent cough by the user during a communication session, a tendency to breathe heavily, etc. As noted previously, it should be appreciated that such detection is a learned behavior. In furtherance of the example, during a previous communication session, the session data collection module 220 may have collected data corresponding to a coughing fit exhibited by the user and a subsequent action by the user of muting the communication session (e.g., via a mute button of the telecommunications device 102) during the coughing fit. Accordingly, the anomaly profile generation module 240 may generate the anomaly profile corresponding to cough detection, such as may be determined upon detection of a guttural noise of the user that was audible prior to the cough, the user's hand motioning toward their mouth, etc., and assign an action to the anomaly profile, such as automatically muting the communication session for at least the duration of the coughing fit.

In another example, the session data collection module 220 may have collected data corresponding to a particular user whose audio stream is received from a remote telecommunications device (e.g., the remote telecommunications device 110 of FIG. 1) whose voice volume is received at a volume lower than a preferred volume. The session data collection module 220 may have further detected a response by the user of increasing a level of volume of the speaker of the telecommunications device 102 (e.g., the speakers 126 of FIG. 1) during the portions of the audio stream in which that particular user is speaking. Accordingly, the anomaly profile generation module 240 may generate an anomaly profile that detects when that particular user is speaking, such as may be based on a context profile, and automatically adjust the speaker volume level during the communication session. In other words, the anomaly profile may detect that particular user as a participant of the conversation and increase the speaker volume level when that particular user's voice is detected and decrease the speaker volume to a previously set volume level, or preferred volume level, during the portions of the audio stream that do not include that particular user's voice.

The session adjustment management module 250 is configured to manage communication session adjustments based on session data of the communication session, the context profile of the communication session, and the anomaly profiles. To do so, the illustrative session adjustment management module 250 includes an anomaly detection module 252, a session adjustment feedback module 254, a component setting adjustment module 256, and an audio stream adjustment module 258.

The anomaly detection module 252 is configured to determine whether to adjust the audio stream and/or a setting of the telecommunications device 102. To do so, the anomaly detection module 252 is configured to detect whether an anomaly exists in a communication session. Accordingly, the anomaly detection module 252 is configured to determine a context profile corresponding to the communication session, such as may be determined by the context management module 230. The anomaly detection module 252 is further configured to analyze incoming session data, such as may be collected by the session data collection module 220. Further, the anomaly detection module 252 is additionally configured to compare the session data against the anomaly profiles, such as may be generated by the anomaly profile generation module, to determine whether an anomaly has been detected.

The session adjustment feedback module 254 is configured to provide feedback of an adjustment to the user. For example, the session adjustment feedback module 254 may be configured to prompt the user whether to associate a particular response with a detected action by the user. In other words, the session adjustment feedback module 254 may be configured to prompt the user whether to generate an anomaly profile, such as may be generated by the anomaly profile generation module 240, corresponding to the context in which the action/response was detected. The session adjustment feedback module 254 may be further configured to receive an input from the user indicating whether to use the detected anomaly presently, or in the future (i.e., whether to save the associated anomaly profile).

The component setting adjustment module 256 is configured to adjust a component setting of the telecommunications device 102 in response to having detected an anomaly, such as may be detected by the anomaly detection module 252. For example, the component setting adjustment module 256 may be configured to adjust an output volume level, an input volume level, etc. It should be appreciated that the component setting adjustment module 256 may have access to API interfaces of one or more components of the telecommunications device 102 that are usable to adjust component settings. The audio stream adjustment module 258 is configured to adjust at least a portion of the audio stream in response to having detected an anomaly, such as may be detected by the anomaly detection module 252. For example, the audio stream adjustment module 258 may be configured to insert audio into the audio stream, remove audio from the audio stream, filter the audio stream, and/or the like.

Figure 3:
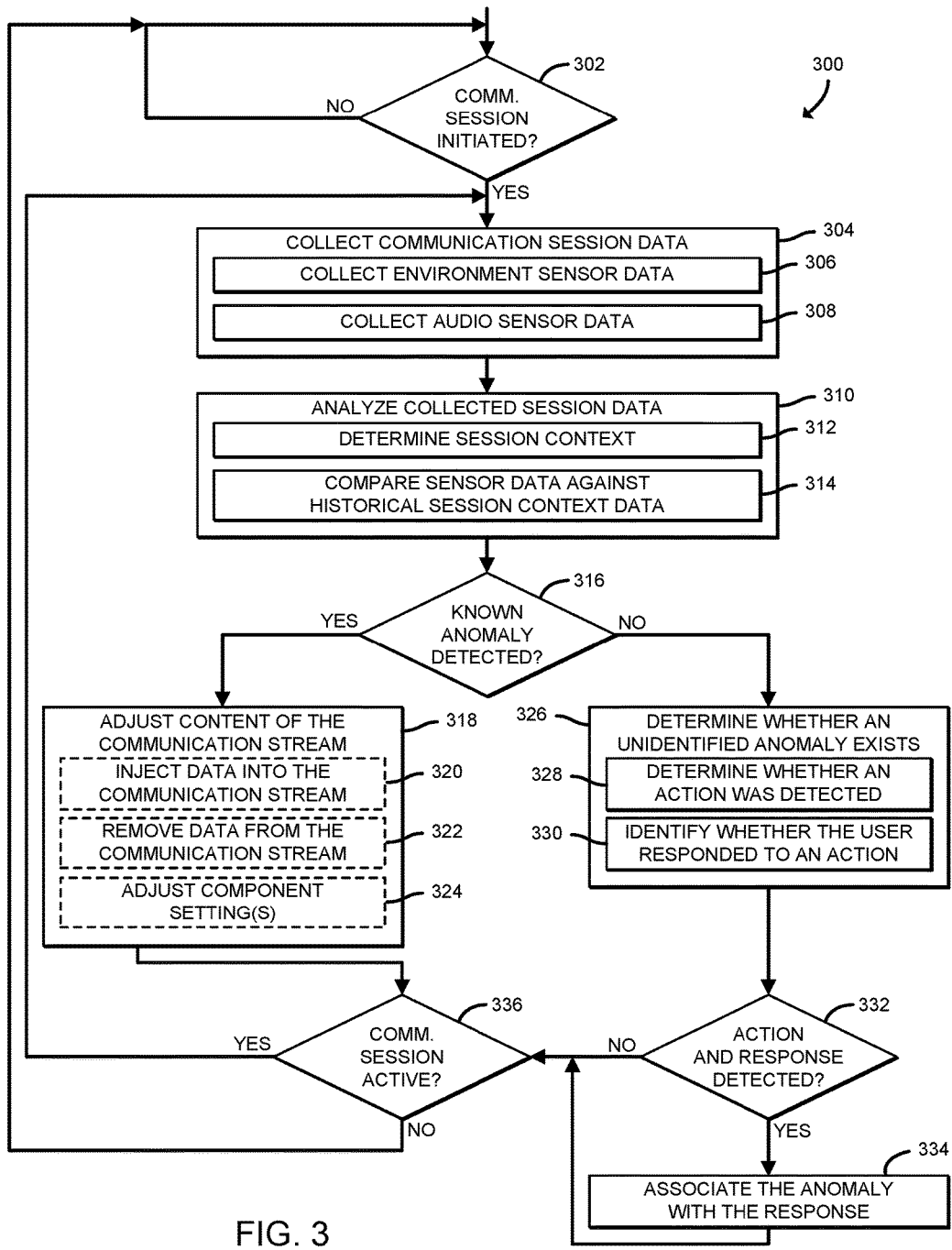
FIG. 3 is a simplified flow diagram of at least one embodiment of a method for dynamically adjusting an audio stream of a communication session that may be executed by the telecommunications device of FIGS. 1 and 2.

Referring now to FIG. 3, in use, the telecommunications device 102 may execute a method 300 for dynamically adjusting an audio stream of a communication session. It should be appreciated that at least a portion of method 300 may be embodied as various instructions stored on a computer-readable media, which may be executed by the processor 112, the communication circuitry 120, and/or other components of the telecommunications device 102 to cause the telecommunications device 102 to perform the method 300. The computer-readable media may be embodied as any type of media capable of being read by the telecommunications device 102 including, but not limited to, the memory 116, the data storage device 118, a local memory of a NIC (not shown) of the communication circuitry 120, other memory or data storage devices of the telecommunications device 102, portable media readable by a peripheral device of the telecommunications device 102, and/or other media.

The method 300 begins in block 302, in which the telecommunications device 102 determines whether a communication session including an audio stream has been initiated. If so, the method 300 advances to block 304, wherein the telecommunications device 102 collects and aggregates communication session data (i.e., sensor data of the communication session) with previously received communication session data (i.e., historical session data) for a user. To do so, in block 306, the telecommunications device 102 collects and aggregates environment sensor data. As described previously, the environment sensor data may include a location, a time of day, a typical action of the user during that time of day in previous communication sessions, a location of the user, a lighting condition, detection of people (i.e., participating and non-participating persons) in the environment 106, a location of the telecommunications device 102 (e.g., a location of the environment 106, a location of the telecommunications device 102 relative to the environment 106, etc.), an image of the user, an image of the environment of the user, an amount of ambient light, an amount of ambient sound, a type of ambient sound, and a proximity of the user to the telecommunications device 102.

Additionally, in block 308, the telecommunications device 102 collects and aggregates audio sensor data (i.e., the audio stream). The audio sensor data may include audible noise attributable to a user of the telecommunications device 102, as well as any background or ambient noise capable of being collected by the telecommunications device 102. It should be appreciated that the audio sensor data may be collected via the one or more microphones 124 of the telecommunications device 102.

In block 310, the telecommunications device 102 analyzes the collected session data (i.e., analyzes the environment sensor data collected in block 306 and/or the audio sensor data collected in block 308). For example, in block 312, the telecommunications device 102 analyzes the collected session data to determine a session context corresponding to the present communication session. The session context may include various session context properties, or characteristics of the communication session data, as may be determined from the session data collected. As described above the session context properties may include a time of day of the communication session, a learned action of the user during that time of day in previous communication sessions, a location of the user, a location of the telecommunications device 102, a recognized voice sample, a voice volume setting, a type of communication session (e.g., business, personal, etc.), a number of participants of the communication session, an identity of the participants of the communication session, a relationship between the participants of the communication session, a location of the telecommunications device 102 in which the communication session is being conducted, a physical condition of the user at the time of the communication session, a number of non-participants in proximity to the telecommunications device 102, an activity one or more of the participants or non-participants is presently engaged in, an emotional state of the participants of the communication session, etc., as well as a typical location of the user during that time of day in previous communication sessions, voice patterns, user reactions, etc., as may be determined based on the analysis thereof. It should be appreciated that the session context (i.e., the session context properties) may be stored in a context profile, as described previously.

Additionally, in block 314, the telecommunications device 102 further analyzes the collected communication session data against historical context data (i.e., previously saved context profiles generated from historical session data) to determine whether a like or sufficiently similar context profile exists, from which anomalies may be detected based on anomaly profiles corresponding to the existing context profile. For example, the telecommunications device 102 may determine that based on a location of the user and/or a time of day, the user is likely in their office at work. As such, a previously generated context profile for the user while in their office at work around that time of day as detected in previous communication sessions may be detected and usable to compare against the subsequently collected session data to detect known anomalies.

In block 316, the telecommunications device 102 determines whether a known anomaly has been detected. If so, the method 300 branches to block 318, in which the telecommunications device 102 adjusts content of the communication stream. It should be appreciated that, as described previously, the content adjustment is the result of a learned behavior. Accordingly, the adjustment corresponds to a previously learned response (i.e., a learned action) to the detected anomaly.

In some embodiments, in block 320, the telecommunications device 102 may adjust content of the communication stream by injecting data into the communication stream. In such an embodiment, the user may want to give the perception that the user is in a different location, in which case the telecommunications device 102 may replace background data, a word or phrase spoken by the user, etc., with other audio data, such as may be retrieved from an audio file stored at the telecommunications device 102. Alternatively, in some embodiments, in block 322, the telecommunications device 102 may remove at least a portion of the audio data from the communication stream prior to transmission. For example, the telecommunications device 102 may examine the audio data for unwanted sounds (e.g., coughs, heavy breathing, ambient noise, etc.). It should be appreciated that the unwanted sounds may be predicated upon a detected user, such that the unwanted sounds may be learned over time for that user and compensated for accordingly. In such an embodiment, the telecommunications device 102 may remove ambient/background noise, audio that is not from the user, a particular phrase spoken by the user, a bodily produced noise, etc. Additionally or alternatively, in some embodiments, in block 324, the telecommunications device 102 may adjust one or more settings of the telecommunications device 102 before the method 300 advances to block 336, which is described below.

If a known anomaly has not been detected in block 316, the method 300 branches to block 326, in which the telecommunications device 102 determines whether an unidentified anomaly has been detected. To do so, in block 328, the telecommunications device 102 determines whether an action (e.g., a gesture) or recognized voice sample (e.g., a previously detected sound, a previously spoken word or phrase, etc.) of the user or another participant of the communication session has been detected by the telecommunications device 102, such as may be determined by performing a context analysis on the communication stream as described previously. Additionally, in block 330, the telecommunications device 102 determines whether the user responded to the action (e.g., adjusted a particular setting of the telecommunications device 102, performed a particular task subsequent to the action, etc.).

In block 332, the telecommunications device 102 determines whether an unidentified anomaly (i.e., an action and subsequent response to the action) was detected. If so, the method 300 advances to block 334, in which the telecommunications device 102 associates the detected action with the detected response (i.e., generates an anomaly profile) before the method 300 advances to block 336. Otherwise, the method 300 advances directly to block 336, wherein the telecommunications device 102 determines whether the communication session is still active. If so, the method 300 returns to block 304, in which the telecommunications device 102 collects additional communication session data; otherwise, the method returns to block 302, in which the telecommunications device 102 determines whether another communication session has been initiated.

EXAMPLES

Illustrative examples of the technologies disclosed herein are provided below. An embodiment of the technologies may include any one or more, and any combination of, the examples described below.

Example 1 includes a telecommunications device for adaptive audio communications, the telecommunications device comprising a session data collection module to collect session data of a communication session between a user of the telecommunications device and at least one other user of a remote telecommunications device communicatively coupled to the telecommunications device, wherein the communication session includes an audio stream; a session adjustment management module to (i) determine a session context of the communication session based on the collected session data, (ii) determine whether the session data includes an anomaly, and (iii) adjust, in response to a determination that the anomaly was detected, at least one of a portion of the audio stream of the communication session and a setting of the telecommunications device based on the anomaly.

Example 2 includes the subject matter of Example 1, and wherein to adjust at least the portion of the audio stream of the communication session comprises to inject audible data into the communication session.

Example 3 includes the subject matter of any of Examples 1 and 2, and wherein to adjust at least the portion of the audio stream of the communication session comprises to remove audible data from the communication session.

Example 4 includes the subject matter of any of Examples 1-3, and wherein to adjust at least the portion of the audio stream of the communication session comprises to adjust one or more components of the telecommunications device.

Example 5 includes the subject matter of any of Examples 1-4, and wherein the session adjustment management module is further to (i) determine one or more actions of the session context, (ii) identifying a response of the user subsequent to the one or more actions, and (iii) associate the one or more actions of the session context with the identified response of the user, and wherein to determine whether the session data includes the anomaly comprises to compare the session data to session data of a previously stored session context.

Example 6 includes the subject matter of any of Examples 1-5, and wherein to determine whether the session context includes an anomaly comprises to compare the session context to a previously saved session context profile, wherein the previously saved session context profile includes one or more session context properties, one or more anomalies associated with at least one of the session context properties, and one or more learned actions by the user in response to an anomaly.

Example 7 includes the subject matter of any of Examples 1-6, and wherein the one or more session context properties includes at least one of a time of day, a learned action, a location, a recognized voice sample, a voice volume setting, a type of communication session, a total number of users, an identity of the users, a relationship between the users, a location of the telecommunications device, a physical condition of the users, a number of non-participating people in proximity to the telecommunications device, an activity of the users, an activity of the non-participating people, an emotional state of the uses, a typical location of the users at that time of day, a voice pattern, and a reaction of the user.

Example 8 includes the subject matter of any of Examples 1-7, and wherein to collect the session data of the communication session comprises to collect sensor data from at least one of a sensor of the telecommunications device or an external sensor communicatively coupled to the telecommunications device.

Example 9 includes the subject matter of any of Examples 1-8, and wherein to collect the session data of the communication session comprises to collect input audio data by a microphone of the telecommunications device and received audio data of the audio stream received from the remote telecommunications device.

Example 10 includes the subject matter of any of Examples 1-9, and wherein to collect the session data of the communication session comprises to collect environment data of an environment in which the telecommunications device is located and wherein determining the session context of the communication session is further based on the environment data.

Example 11 includes the subject matter of any of Examples 1-10, and wherein to collect the environment data comprises to collect at least one of a time of day, a location of the telecommunications device, a location of the user, an image of the user, an image of the environment of the user, an amount of ambient light, an amount of ambient sound, a type of ambient sound, and a proximity of the user to the telecommunications device.

Example 12 includes the subject matter of any of Examples 1-11, and wherein to determine whether the session context includes the anomaly comprises to analyze the environment data to detect whether the user is performing a gesture, and wherein to adjust the at least the portion of the audio stream of the communication session comprises to adjust the at least the portion of the audio stream of the communication session based on the gesture.

Example 13 includes the subject matter of any of Examples 1-12, and wherein the anomaly comprises at least one of a gesture, a voice sample, a volume discrepancy, a volume adjustment, a background noise, and a type of noise.

Example 14 includes a method for adaptive audio communications, the method comprising collecting, by a telecommunications device, session data of a communication session between a user of the telecommunications device and at least one other user of a remote telecommunications device communicatively coupled to the telecommunications device, wherein the communication session includes an audio stream; determining, by the telecommunications device, a session context of the communication session based on the collected session data; determining, by the telecommunications device, whether the session data includes an anomaly; adjusting, by the telecommunications device and in response to a determination that the session context includes an anomaly, at least one of a portion of the audio stream of the communication session and a setting of the telecommunications device based on the anomaly.

Example 15 includes the subject matter of Example 14, and wherein adjusting at least the portion of the audio stream of the communication session comprises injecting audible data into the communication session.

Example 16 includes the subject matter of any of Examples 14 and 15, and wherein adjusting at least the portion of the audio stream of the communication session comprises removing audible data from the communication session.

Example 17 includes the subject matter of any of Examples 14-16, and wherein adjusting at least the portion of the audio stream of the communication session comprises adjusting one or more components of the telecommunications device.

Example 18 includes the subject matter of any of Examples 14-17, and further including determining, by the telecommunications device, one or more actions of the session context; identifying, by the telecommunications device, a response of the user subsequent to the one or more actions; and associating, by the telecommunications device, the one or more actions of the session context with the identified response of the user, wherein determining whether the session data includes the anomaly comprises comparing the session data to session data of a previously stored session context.

Example 19 includes the subject matter of any of Examples 14-18, and wherein determining whether the session context includes an anomaly comprises comparing the session context to a previously saved session context profile, wherein comparing the session context to the previously saved session context profile comprises comparing the session context to one or more session context properties, one or more anomalies associated with at least one of the session context properties, and one or more user reactions by the user corresponding to an anomaly.

Example 20 includes the subject matter of any of Examples 14-19, and wherein comparing the session context to the one or more session context properties comprises comparing the session context to at least one of a at least one of a time of day, a learned action, a location, a recognized voice sample, a voice volume setting, a type of communication session, a total number of users, an identity of the users, a relationship between the users, a location of the telecommunications device, a physical condition of the users, a number of non-participating people in proximity to the telecommunications device, an activity of the users, an activity of the non-participating people, an emotional state of the uses, a typical location of the users at that time of day, a voice pattern, and a reaction of the user.

Example 21 includes the subject matter of any of Examples 14-20, and wherein collecting the session data of the communication session comprises collecting sensor data from at least one of a sensor of the telecommunications device or an external sensor communicatively coupled to the telecommunications device.

Example 22 includes the subject matter of any of Examples 14-21, and wherein collecting the session data of the communication session comprises collecting input audio data by a microphone of the telecommunications device and received audio data of the audio stream received from the remote telecommunications device.

Example 23 includes the subject matter of any of Examples 14-22, and wherein collecting the session data of the communication session comprises collecting environment data of an environment in which the telecommunications device is located and wherein determining the session context of the communication session is further based on the environment data.

Example 24 includes the subject matter of any of Examples 14-23, and wherein collecting the environment data comprises collecting at least one of a time of day, a location of the telecommunications device, an image of the user, an image of the environment of the user, an amount of ambient light, an amount of ambient sound, a type of ambient sound, and a proximity of the user to the telecommunications device.

Example 25 includes the subject matter of any of Examples 14-24, and wherein determining whether the session context includes the anomaly comprises analyzing the environment data to detect whether the user is performing a gesture, and wherein adjusting the at least the portion of the audio stream of the communication session comprises adjusting the at least the portion of the audio stream of the communication session based on the gesture.

Example 26 includes the subject matter of any of Examples 14-25, and wherein determining whether the session data includes the anomaly comprises determining whether the session data includes at least one of a gesture, a voice sample, a volume discrepancy, a volume adjustment, a background noise, and a type of noise.

Example 27 includes a destination computing device comprising a processor; and a memory having stored therein a plurality of instructions that when executed by the processor cause the destination computing device to perform the method of any of Examples 14-26.

Example 28 includes one or more machine readable storage media comprising a plurality of instructions stored thereon that in response to being executed result in a destination computing device performing the method of any of Examples 14-26.

Example 29 includes a telecommunications device for adaptive audio communications, the telecommunications device comprising means for collecting session data of a communication session between a user of the telecommunications device and at least one other user of a remote telecommunications device communicatively coupled to the telecommunications device, wherein the communication session includes an audio stream; means for determining a session context of the communication session based on the collected session data; means for determining whether the session data includes an anomaly; means for adjusting, in response to a determination that the session context includes an anomaly, at least one of a portion of the audio stream of the communication session and a setting of the telecommunications device based on the anomaly.

Example 30 includes the subject matter of Example 29, and wherein the means for adjusting at least the portion of the audio stream of the communication session comprises means for injecting audible data into the communication session.

Example 31 includes the subject matter of any of Examples 29 and 30, and wherein the means for adjusting at least the portion of the audio stream of the communication session comprises means for removing audible data from the communication session.

Example 32 includes the subject matter of any of Examples 29-31, and wherein the means for adjusting at least the portion of the audio stream of the communication session comprises means for adjusting one or more components of the telecommunications device.

Example 33 includes the subject matter of any of Examples 29-32, and further including means for determining one or more actions of the session context; means for identifying a response of the user subsequent to the one or more actions; and means for associating the one or more actions of the session context with the identified response of the user, wherein the means for determining whether the session data includes the anomaly comprises comparing the session data to session data of a previously stored session context.

Example 34 includes the subject matter of any of Examples 29-33, and wherein the means for determining whether the session context includes an anomaly comprises means for comparing the session context to a previously saved session context profile, wherein the means for comparing the session context to the previously saved session context profile comprises means for comparing the session context to one or more session context properties, one or more anomalies associated with at least one of the session context properties, and one or more user reactions by the user corresponding to an anomaly.

Example 35 includes the subject matter of any of Examples 29-34, and wherein the means for comparing the session context to the one or more session context properties comprises means for comparing the session context to at least one of a at least one of a time of day, a learned action, a location, a recognized voice sample, a voice volume setting, a type of communication session, a total number of users, an identity of the users, a relationship between the users, a location of the telecommunications device, a physical condition of the users, a number of non-participating people in proximity to the telecommunications device, an activity of the users, an activity of the non-participating people, an emotional state of the uses, a typical location of the users at that time of day, a voice pattern, and a reaction of the user.

Example 36 includes the subject matter of any of Examples 29-35, and wherein the means for collecting the session data of the communication session comprises means for collecting sensor data from at least one of a sensor of the telecommunications device or an external sensor communicatively coupled to the telecommunications device.

Example 37 includes the subject matter of any of Examples 29-36, and wherein the means for collecting the session data of the communication session comprises means for collecting input audio data by a microphone of the telecommunications device and received audio data of the audio stream received from the remote telecommunications device.

Example 38 includes the subject matter of any of Examples 29-37, and wherein the means for collecting the session data of the communication session comprises means for collecting environment data of an environment in which the telecommunications device is located and wherein determining the session context of the communication session is further based on the environment data.

Example 39 includes the subject matter of any of Examples 29-38, and wherein the means for collecting the environment data comprises means for collecting at least one of a time of day, a location of the telecommunications device, an image of the user, an image of the environment of the user, an amount of ambient light, an amount of ambient sound, a type of ambient sound, and a proximity of the user to the telecommunications device.

Example 40 includes the subject matter of any of Examples 29-39, and wherein the means for determining whether the session context includes the anomaly comprises means for analyzing the environment data to detect whether the user is performing a gesture, and wherein the means for adjusting the at least the portion of the audio stream of the communication session comprises means for adjusting the at least the portion of the audio stream of the communication session based on the gesture.

Example 41 includes the subject matter of any of Examples 29-40, and wherein the means for determining whether the session data includes the anomaly comprises means for determining whether the session data includes at least one of a gesture, a voice sample, a volume discrepancy, a volume adjustment, a background noise, and a type of noise.

The invention claimed is:

1. A telecommunications device for adaptive audio communications, the telecommunications device comprising:
    a session data collection module to collect session data of a communication session between a user of the telecommunications device and at least one other user of a remote telecommunications device communicatively coupled to the telecommunications device, wherein the communication session includes an audio stream;
    a session adjustment management module to (i) determine a session context of the communication session based on the collected session data, (ii) compare the collected session data to session data of a previously stored session context, (iii) determine whether the collected session data includes an anomaly based on a result of the comparison, (iv) identify, in response to a determination that the anomaly was detected, a previously learned response to the detected anomaly, and (v) adjust a portion of the audio stream of the communication session and a setting of the telecommunications device based on the identified previously learned response to the anomaly.

2. The telecommunications device of claim 1, wherein to adjust at least a portion of the audio stream of the communication session comprises to at least one of inject audible data into the communication session, remove audible data from the communication session, and adjust one or more components of the telecommunications device.

3. The telecommunications device of claim 1, wherein the session adjustment management module is further to (i) determine one or more actions of the session context, (ii) identify a response of the user subsequent to the one or more actions, and (iii) associate the one or more actions of the session context with the identified response of the user.

4. The telecommunications device of claim 1, wherein to compare the collected session data to the session data of the previously stored session context comprises to compare the session context of the communication session to a previously saved session context profile, wherein the previously saved session context profile includes one or more session context properties, one or more anomalies associated with at least one of the session context properties, and one or more learned responses by the user in response to each of the one or more anomalies.

5. The telecommunications device of claim 4, wherein the one or more session context properties includes at least one of a time of day, a learned action, a location, a recognized voice sample, a voice volume setting, a type of communication session, a total number of users, an identity of the users, a relationship between the users, a location of the telecommunications device, a physical condition of the users, a number of non-participating people in proximity to the telecommunications device, an activity of the users, an activity of the non-participating people, an emotional state of the uses, a typical location of the users at that time of day, a voice pattern, and a reaction of the user.

6. The telecommunications device of claim 1, wherein to collect the session data of the communication session comprises to collect sensor data from at least one of a sensor of the telecommunications device or an external sensor communicatively coupled to the telecommunications device.

7. The telecommunications device of claim 1, wherein to collect the session data of the communication session comprises to collect at least one of input audio data by a microphone of the telecommunications device and audio data of the audio stream received from the remote telecommunications device.

8. The telecommunications device of claim 1, wherein to collect the session data of the communication session comprises to collect environment data of an environment in which the telecommunications device is located, and wherein the collect the environment data comprises to collect at least one of at least one of a time of day, a location of the telecommunications device, a location of the user, an image of the user, an image of the environment of the user, an amount of ambient light, an amount of ambient sound, a type of ambient sound, and a proximity of the user to the telecommunications device.

9. The telecommunications device of claim 1,
wherein to determine the session context comprises to analyze an image of an environment of the user to detect whether the user is performing a gesture,
wherein to compare the collected session data comprises to compare the detected gesture to a known anomaly to identify a previously learned response, and
wherein to adjust the at least the portion of the audio stream of the communication session comprises to adjust the at least the portion of the audio stream of the communication session based on the identified previously learned response to the gesture.

10. The telecommunications device of claim 1, wherein the anomaly comprises at least one of a gesture, a voice sample, a volume discrepancy, a volume adjustment, a background noise, and a type of noise.

11. One or more non-transitory, machine-readable storage media comprising a plurality of instructions stored thereon that, in response to execution by a telecommunications device, cause the telecommunications device to:
collect session data of a communication session between a user of the telecommunications device and at least one other user of a remote telecommunications device communicatively coupled to the telecommunications device, wherein the communication session includes an audio stream;
determine a session context of the communication session based on the collected session data;
compare the collected session data to session data of a previously stored session context;
determine whether the collected session data includes an anomaly based on a result of the comparison;
identify, in response to a determination that the anomaly was detected, a previously learned response to the detected anomaly; and
adjust a portion of the audio stream of the communication session and a setting of the telecommunications device based on the identified previously learned response to the anomaly.

12. The one or more non-transitory, machine-readable storage media of claim 11, wherein to adjust at least a portion of the audio stream of the communication session comprises to at least one of inject audible data into the communication session, remove audible data from the communication session, and adjust one or more components of the telecommunications device.

13. The one or more non-transitory, machine-readable storage media of claim 11, wherein the plurality of instructions, when executed, further cause the telecommunication device to (i) determine one or more actions of the session context, (ii) identify a response of the user subsequent to the one or more actions, and (iii) associate the one or more actions of the session context with the identified response of the user.

14. The one or more non-transitory, machine-readable storage media of claim 11, wherein to compare the collected session data to the session data of the previously stored session context comprises to compare the session context of the communication session to a previously saved session context profile, wherein the previously saved session context profile includes one or more session context properties, one or more anomalies associated with at least one of the session context properties, and one or more learned responses by the user in response to each of the one or more anomalies.

15. The one or more non-transitory, machine-readable storage media of claim 14, wherein the one or more session context properties includes at least one of a time of day, a learned action, a location, a recognized voice sample, a voice volume setting, a type of communication session, a total number of users, an identity of the users, a relationship between the users, a location of the telecommunications device, a physical condition of the users, a number of non-participating people in proximity to the telecommunications device, an activity of the users, an activity of the non-participating people, an emotional state of the uses, a typical location of the users at that time of day, a voice pattern, and a reaction of the user.

16. The one or more non-transitory, machine-readable storage media of claim 11, wherein to collect the session data of the communication session comprises to collect sensor data from at least one of a sensor of the telecommunications device or an external sensor communicatively coupled to the telecommunications device.

17. The one or more non-transitory, machine-readable storage media of claim 11, wherein to collect the session data of the communication session comprises to collect at least one of input audio data by a microphone of the telecommunications device, and audio data of the audio stream received from the remote telecommunications device.

18. The one or more non-transitory, machine-readable storage media of claim 11, wherein to collect the session data of the communication session comprises to collect environment data of an environment in which the telecommunications device is located, and wherein the collect the environment data comprises to collect at least one of at least one of a time of day, a location of the telecommunications device, a location of the user, an image of the user, an image of the environment of the user, an amount of ambient light, an amount of ambient sound, a type of ambient sound, and a proximity of the user to the telecommunications device.

19. The one or more non-transitory, machine-readable storage media of claim 11, wherein to determine the session context comprises to analyze an image of an environment of the user to detect whether the user is performing a gesture, wherein to compare the collected session data comprises to compare the detected gesture to a known anomaly to identify a previously learned response, and wherein to adjust the at least the portion of the audio stream of the communication session comprises to adjust the at least the portion of the audio stream of the communication session based on the identified previously learned response to the gesture.

20. The one or more non-transitory, machine-readable storage media of claim 11, wherein the anomaly comprises at least one of a gesture, a voice sample, a volume discrepancy, a volume adjustment, a background noise, and a type of noise.

21. A method for adaptive audio communications, the method comprising:
collecting, by a telecommunications device, session data of a communication session between a user of the telecommunications device and at least one other user of a remote telecommunications device communicatively coupled to the telecommunications device, wherein the communication session includes an audio stream;
determining, by the telecommunications device, a session context of the communication session based on the collected session data;
comparing, by the telecommunications device, the collected session data to session data of a previously stored session context;

determining, by the telecommunications device, whether the collected session data includes an anomaly based on a result of the comparison;

identifying, in response to a determination that the anomaly was detected, a previously learned response to the detected anomaly; and adjusting, by the telecommunications, a portion of the audio stream of the communication session and a setting of the telecommunications device based on the identified previously learned response to the anomaly.

22. The method of claim 21, wherein adjusting at least a portion of the audio stream of the communication session comprises to at least one of inject audible data into the communication session, remove audible data from the communication session, and adjust one or more components of the telecommunications device.

23. The method of claim 21, further comprising:

determining, by the telecommunications device, one or more actions of the session context;

identifying, by the telecommunications device, a response of the user subsequent to the one or more actions; and associating, by the telecommunications device, the one or more actions of the session context with the identified response of the user.

24. The method of claim 21, wherein comparing the collected session data to the session data of the previously stored session context comprises comparing the session context of the communication session to a previously saved session context profile, wherein comparing the session context to the previously saved session context profile comprises comparing the session context to one or more session context properties, one or more anomalies associated with at least one of the session context properties, and one or more learned responses by the user in response to each of the one or more anomalies.

25. The method of claim 21, wherein collecting the session data of the communication session comprises collecting at least one of sensor data from at least one of a sensor of the telecommunications device or an external sensor communicatively coupled to the telecommunications device, input audio data from a microphone of the telecommunications device, received audio data of the audio stream received from the remote telecommunications device, and environment data of an environment in which the telecommunications device is located and wherein determining the session context of the communication session is further based on the environment data.

* * * * *